United States Patent [19]
Lindén

[11] Patent Number: 6,101,725
[45] Date of Patent: Aug. 15, 2000

[54] FOOT OPERATED CUTTING DEVICE

[75] Inventor: Erkki Olavi Lindén, Billnäs, Finland

[73] Assignee: Fiskars Consumer Oy Ab, Finland

[21] Appl. No.: 09/281,524

[22] Filed: Mar. 30, 1999

[51] Int. Cl.⁷ .................................................. B26B 13/00
[52] U.S. Cl. ................................. 30/188; 30/228; 30/249
[58] Field of Search .......................... 30/178, 228, 180, 30/210, 187–188, 245, 249–250, 203; 83/541, 684, 686

[56] References Cited

U.S. PATENT DOCUMENTS

| | | |
|---|---|---|
| 1,370,208 | 3/1921 | Halicki . |
| 1,486,140 | 3/1924 | Hickey ................................... 30/216 X |
| 1,921,058 | 8/1933 | Warren ................................... 83/686 X |
| 2,542,384 | 2/1951 | Altenpohl, Jr. . |
| 3,670,411 | 6/1972 | Peters ..................................... 30/245 X |
| 4,197,706 | 4/1980 | Blake . |
| 4,224,739 | 9/1980 | Emblidge . |
| 5,347,800 | 9/1994 | Morgan . |

FOREIGN PATENT DOCUMENTS

| | | | |
|---|---|---|---|
| 2628935 | 9/1989 | France ..................................... 30/249 |

*Primary Examiner*—Douglas D. Watts
*Attorney, Agent, or Firm*—Foley & Lardner

[57] ABSTRACT

A foot operated cutting device used to perform pruning, shearing, trimming, and similar operations includes a cutting head provided with a spring biased blade cooperating with a jaw, an actuating mechanism in a housing coupled to a foot actuating device. The foot operated cutting device generates power from a force input supplied by a user to the foot actuator.

14 Claims, 4 Drawing Sheets

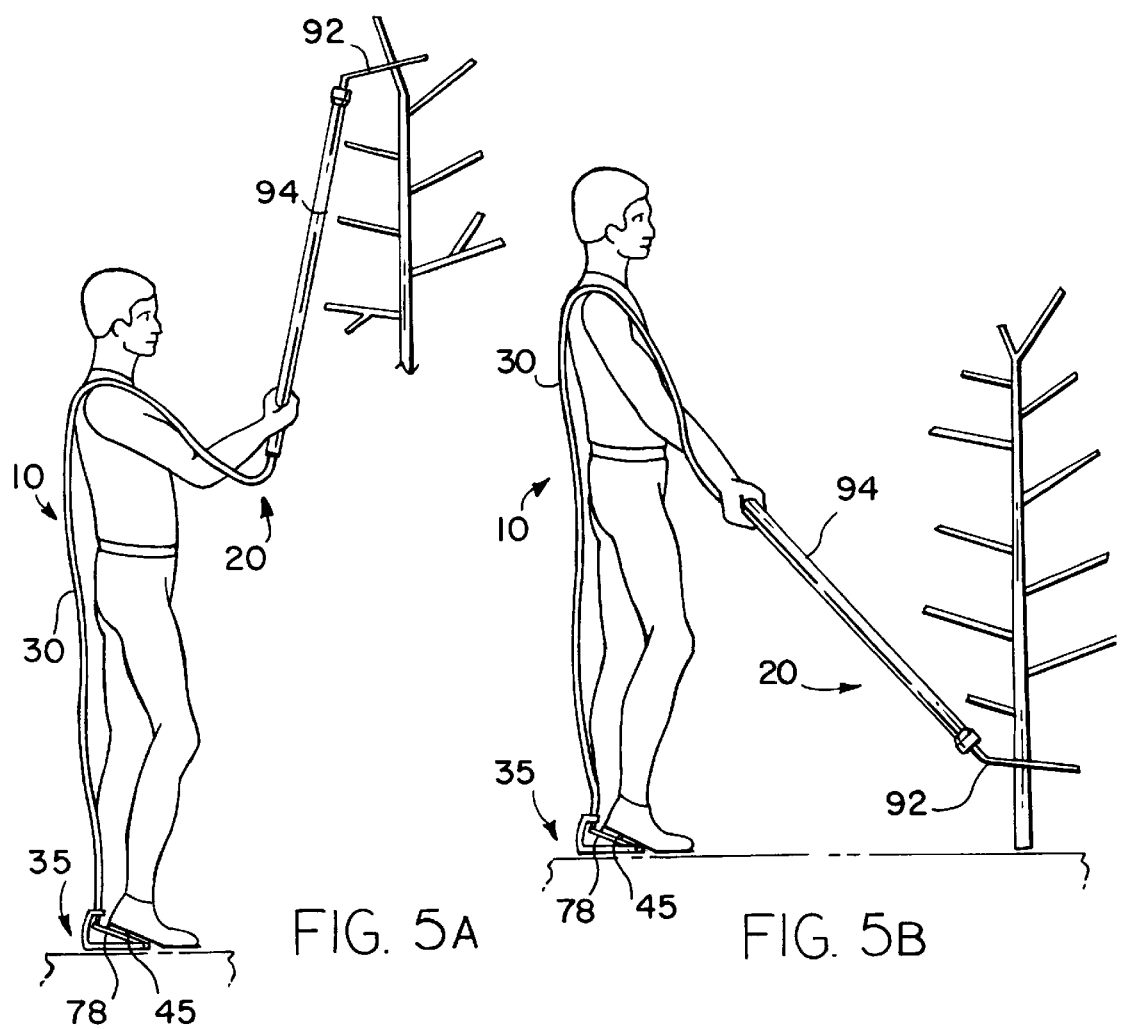
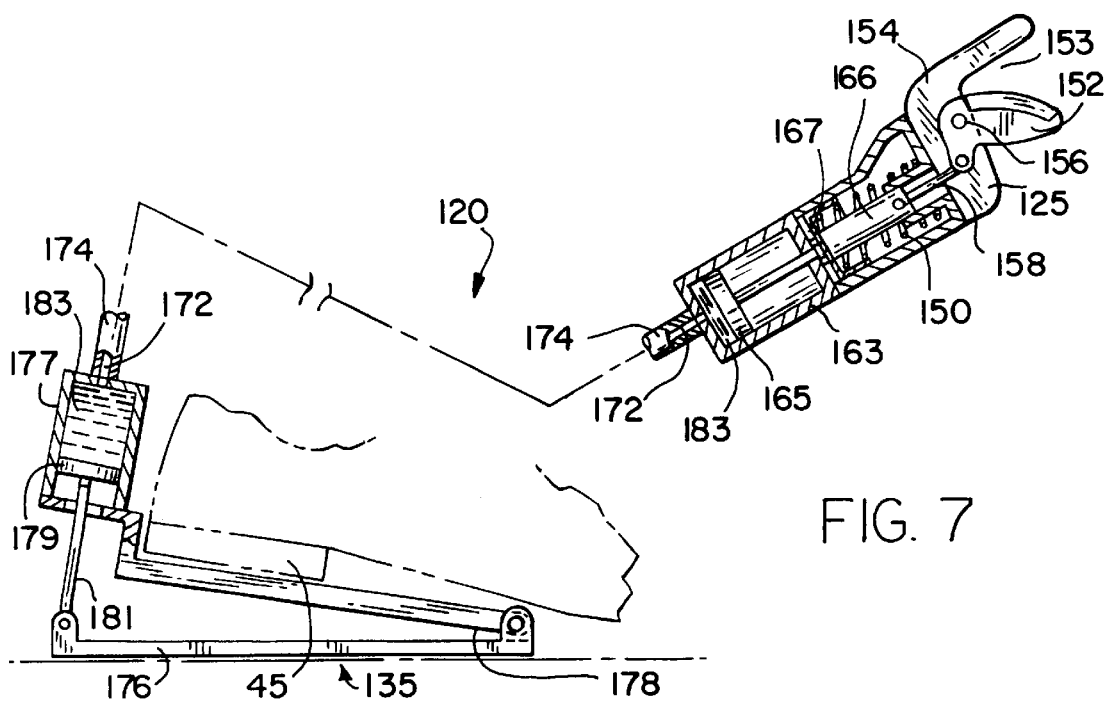

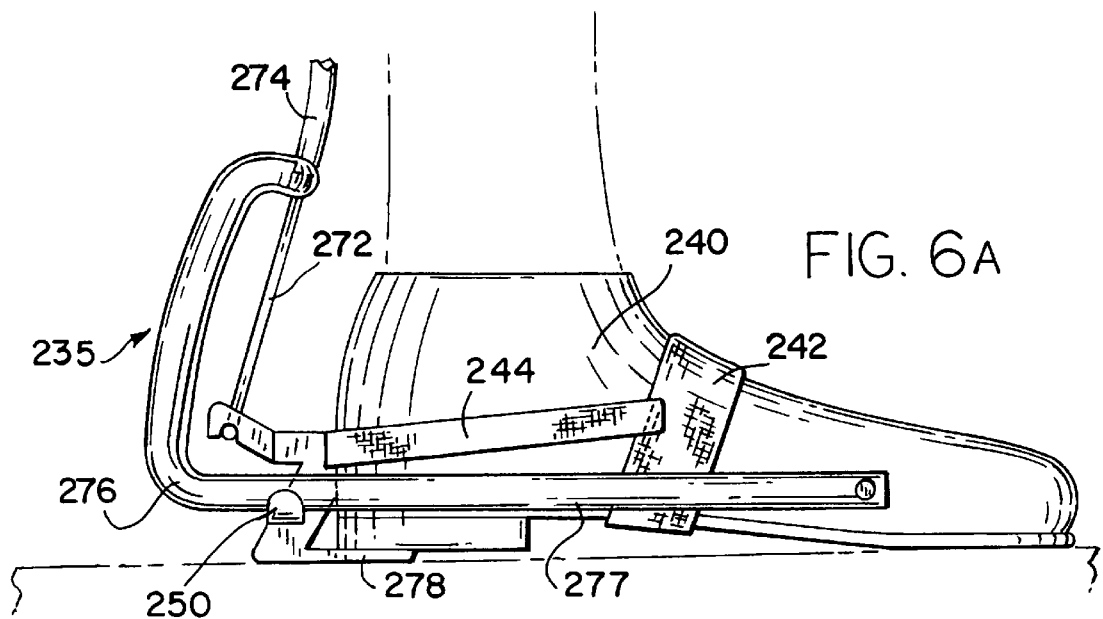
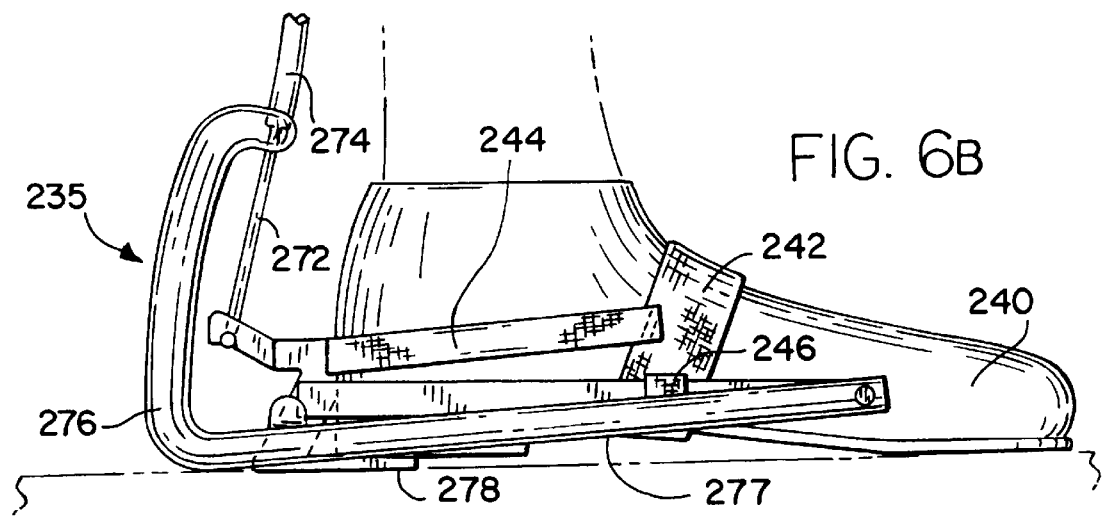
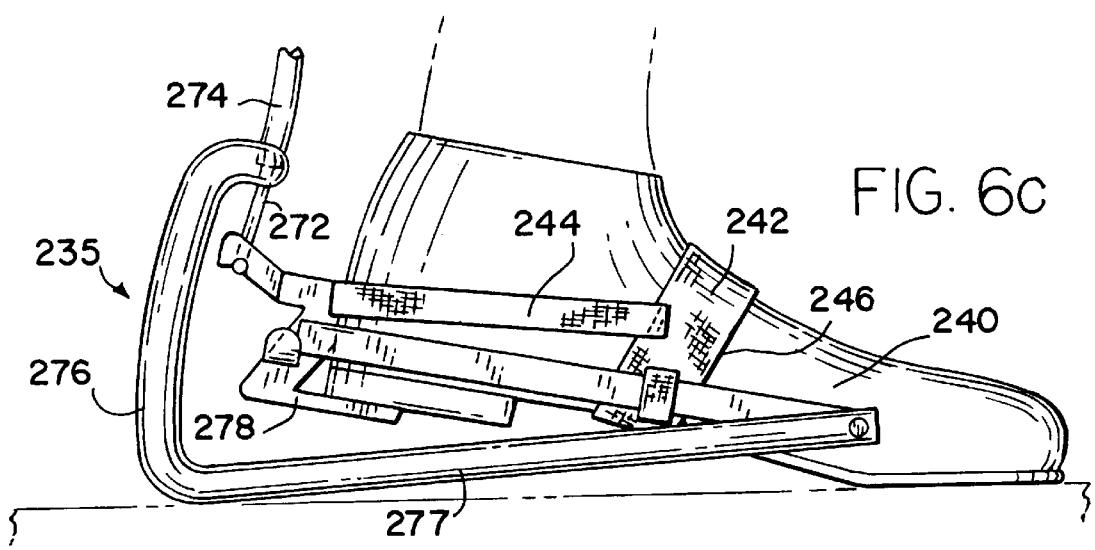

FOOT OPERATED CUTTING DEVICE

BACKGROUND OF THE INVENTION

Many cutting devices used in gardening include a pair of handle sections which are operated by a hand, and a cutting head attached to the handle sections. The cutting head performs either a scissors action or an anvil-type lopping action. Cutting devices of this type include hand driven pruners, hedge shears, grass shears, and the like.

Hand driven devices such as those mentioned above, provide severe drawbacks, especially during extended work periods. Even during times of limited work periods, hand driven cutting devices are limited by the power of the hand itself. In periods of extended work, hand driven cutting devices require that the hand and arm be held in difficult and awkward positions in order to extend reach and to cut at a variety of angles. Placing the hand and arm in awkward positions leads to fatigue of the hand and arm muscles and in the long term can produce problems with tendons, especially in the so-called carpal tunnel areas of the hand and wrist, and further strenuous hand operation may cause blisters of the hand.

For professional applications, a variety of powered devices have been developed. For example electric, pneumatic, hydraulic, and gas-powered cutting devices have been developed and used. These devices, although not requiring cutting input to be provided by the hand, still have a number of drawbacks. These drawbacks include high price, due to the complexity of the devices and high weight, due to the power plants for the devices. For example, a battery driven unit requires a heavy pack of batteries that must be carried on an operator's back. The weight of these battery units may be in the range of 5–10 kilograms, or more. Therefore, although powered devices have as their goal, less fatigue for an operator, because the cutting power is provided by an electric, pneumatic, hydraulic, or gas powered device, fatigue is still produced because an operator is still burdened with the weight of these devices while working in the garden or field. Furthermore, the complexity of these powered devices typically produces bulkiness or awkwardness making it both difficult to transport and difficult to position the cutting head at the proper angle to produce the desired cutting result.

There is a need and desire for a foot driven cutting device that has a reduced amount of complexity when compared with other powered cutting devices.

There is also a need and desire for a foot driven cutting device for which the legs of an operator provide the cutting force that is transmitted to a cutting head and the hand of the operator is used to control the cutting head.

There is also a need and desire for a foot operated cutting devices that does not require any accessories beyond a foot actuator, a cutting device, and a force transmitter connecting the foot actuator and the cutting device. Further still, there is a need and desire for a foot actuated cutting device that provides less fatigue for an operator when compared with traditional hand driven cutting devices.

SUMMARY OF THE INVENTION

The invention relates to a cutting device including a cutting head, a housing supporting the cutting head, and an actuation mechanism. The actuation mechanism includes a foot actuator, and a flexible force transmitter coupled to the foot actuator on a first end and coupled to the housing on a second end. The actuation mechanism transmits a force input from the foot actuator through the flexible force transmitter and to the cutting head thereby producing a cutting action.

The invention further relates to a cutting device including a cutting head, a foot actuator, a flexible force transmitter, and a housing. The flexible force transmitter is coupled to the foot actuator on a first end, and the housing supports the cutting head and includes a drive mechanism. The drive mechanism couples the flexible force transmitter to the blade. The flexible force transmitter receives a force input from the foot actuator and provides a force, through the flexible force transmitter, to the blade.

The invention still further relates to a cutting device including a cutting head, a foot actuator, a housing, and a hydraulic hose. The foot actuator has a first hydraulic cylinder coupled thereto. The housing supports the cutting head and a second hydraulic cylinder. The second hydraulic cylinder is coupled to the cutting head. The hydraulic hose is coupled to the first hydraulic cylinder on a first end and coupled to the second hydraulic cylinder on a second end, the hydraulic hose communicates hydraulic fluid between the first and second hydraulic cylinders. The foot actuator receives a force input, the force input is transmitted to the first hydraulic cylinder thereby causing hydraulic fluid to flow through the hydraulic hose and causing movement in the second hydraulic cylinder.

BRIEF DESCRIPTION OF THE DRAWINGS

Preferred exemplary embodiments of the present invention will hereinafter be described in conjunction with the appended drawings, wherein like reference numerals denote like elements and;

FIGS. 5A and 5B depict an operator using a foot operated cutting device having an extension handle;

FIG. 6A depicts a foot actuator that is attachable to a shoe, the foot actuator being in a locked stated;

FIG. 6B depicts the foot actuator of FIG. 6A in an actuated but unlocked state;

FIG. 6C depicts the foot actuator of FIG. 6A in an unlocked and non-actuated state;

FIG. 7 depicts a foot operated cutting device having a hydraulic cylinder at the foot actuator and a hydraulic cylinder at the cutting head.

DETAILED DESCRIPTION OF THE PREFERRED EMBODIMENTS

Figure 1:
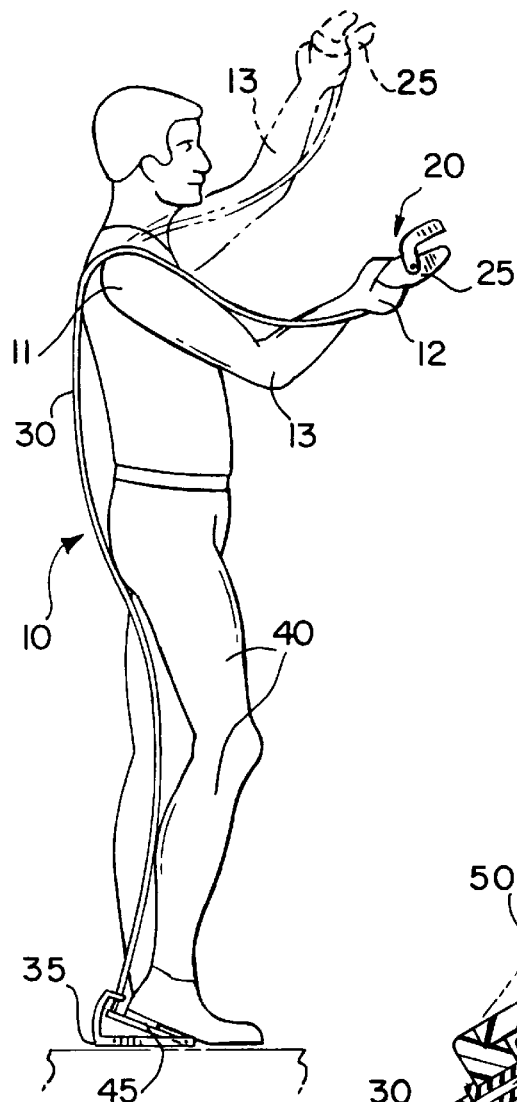
FIG. 1 depicts an operator using a foot operated cutting device.

The present invention relates to cutting tools such as pruners, head shears, or grass shears. However, while the invention as described herein will often be referred to as a pruner, those skilled in the art will appreciate that the mechanisms described herein and their principles of operation can be broadly applied to a wide variety of other cutting implements generally. Referring to FIG. 1, an operator 10 is depicted using a foot operated pruner 20. Foot operated pruner 20 includes a cutting head 25, a flexible force transmitter 30, and a foot actuator 35. Power is transmitted to the cutting head from the leg muscles 40 of operator 10 as operator 10 presses his heel 45 down on actuator 35. The force generated by leg muscles 40 is transmitted through flexible force transmitter 30 to the cutting head 25. It should be noted that although operator 10 is shown using the foot operated pruner 20 with his heel 45, other portions of the body could be used to provide force to foot actuator 35 including, but not limited to, the operator's toe 46.

In a preferred embodiment of the present invention, flexible force transmitter 30 may be routed over the shoulder 11 of operator 10 (depicted in FIGS. 1, 5A, and 5B) to minimize interference with objects that may be close to operator 10, such as twigs or branches and the like. As depicted in FIG. 1, flexible force transmitter 30 has sufficient slack so that an arm 13 of operator 10 may be in a multiplicity of positions (one alternative position is depicted by phantom lines in FIG. 1) to place cutting head 25 at different cutting positions.

Figure 2:
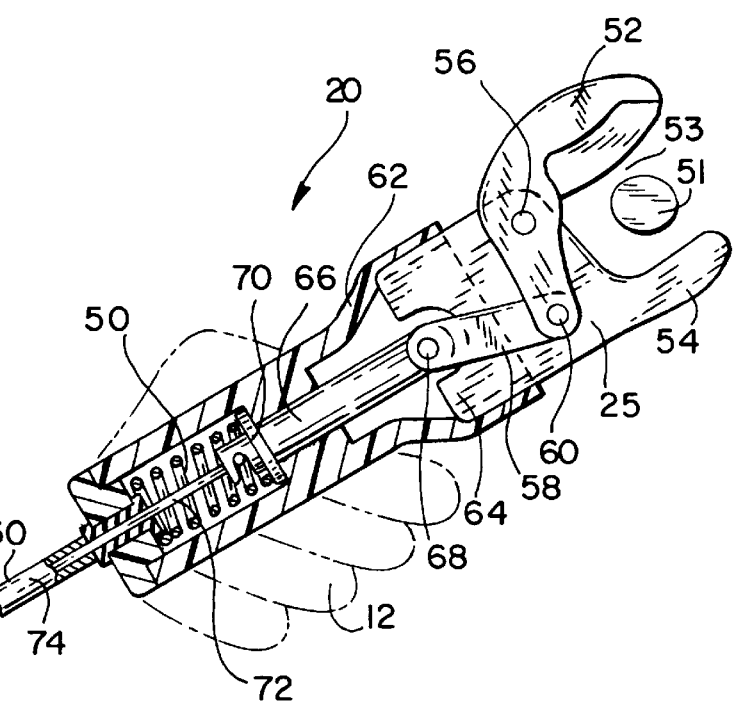
FIG. 2 is a partial cut away view of a cutting head and an elevational view of a foot actuator, the foot actuator being in a non-actuated position and the jaws of the cutting device being open.
Figure 2:
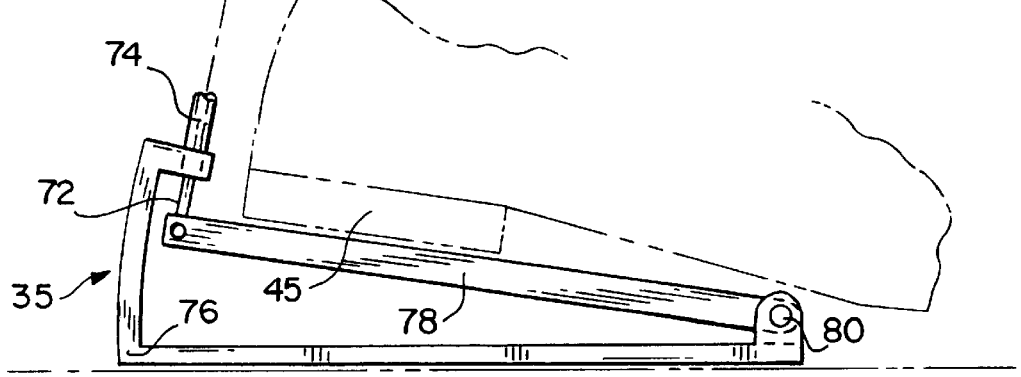

Referring now to FIG. 2, foot operated pruner 20 is depicted in a non-actuated or open state. In other words, foot actuator 35 is not being actuated by heel 45 therefore, cutting head 25 is biased in an open position by a biasing spring 50. Cutting head 25 includes a blade 52 pivotally coupled to a jaw 54 at a pin 56. Blade 52 and jaw 54 create a bight 53 designed to receive a workpiece 51, such as twigs or branches. Blade 56 is pivotally coupled to a connecting link 58 at a pin 60 and jaw 54 is coupled to a housing 62 at a jaw base 64. Connecting link 58 is pivotally coupled to a rod 66 at a pin 68. Rod 66 is constrained to slide substantially linearly within housing 62. The linear travel of rod 66 is limited by a stop 70 that is coupled to rod 66 and engages housing 62 when cutting device 25 is in a fully open position as depicted in FIG. 2. Rod 66 is also coupled to a cable 72, cable 72 transmits the force from foot actuator 35 to cutting head 25. Biasing spring 50 forces rod 66 and therefore blade 52 into the fully open position depicted in FIG. 2 when there is little or no force being transmitted through cable 72.

Figure 3:
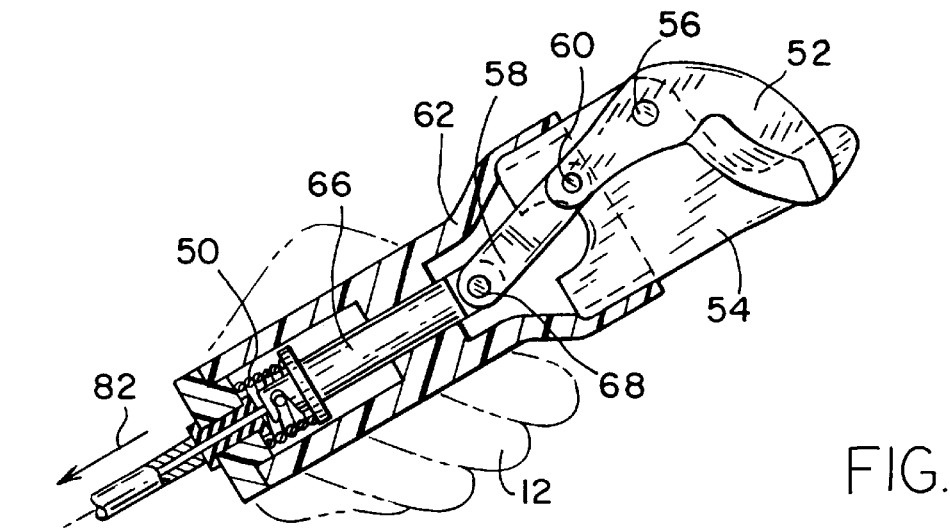
FIG. 3 depicts the same cutting device and foot actuator as depicted in FIG. 2 but having the foot actuator in an actuated state and depicting the cutting head in a closed state.

Cable 72 slides within a sheath 74, sheath 74 extending between housing 62 and foot actuator 35. Cable 72 and sheath 74 make up flexible force transmitter 30. Foot actuator 35 includes a base 76 and a tread 78 pivotally coupled to base 76 at a pin 80. Sheath 74 is coupled to base 76 and cable 72 is coupled to tread 78 so that when leg muscles 40 of operator 10 produce a force on heel 45, as depicted in FIG. 3, the rotational movement of tread 78 causes cable 72 to be extended from sheath 74 at base 76. Therefore, cable 72 transmits a force produced from heel 45 through cable 72 to rod 66. As depicted in FIG. 3, rod 66 travels in a direction shown by arrow 82. As rod 66 is pulled in direction 82, connecting link 58 causes blade 52 to rotate about pin 56 and thereby causing cutting head 25 to come to a closed position as depicted in FIG. 3 whereby blade 52 overlaps or contacts jaw 54. As depicted in FIG. 3, with bight 53 closed, workpiece 51 has been severed. Because leg muscles 40 are capable of supplying a much greater force to foot actuator 35 than the force that could be supplied by an operator's hand to the handles of a conventional cutting device, foot operated pruner 20 is able to sever heavier branches than can be severed using a conventional pruner.

As rod 66 is moved in direction 82, biasing spring 50 is compressed as depicted in FIG. 3 thereby storing potential energy. Potential energy stored in biasing spring 50 may be used later to return blade 52 to the open position, as depicted in FIG. 2.

As depicted in FIG. 1, operator 10 holds cutting head 25 in his hand 12. As depicted in FIGS. 2 and 3, hand 12 grasps housing 62 to position cutting head 25 in the appropriate cutting position and orientation.

Figure 4:
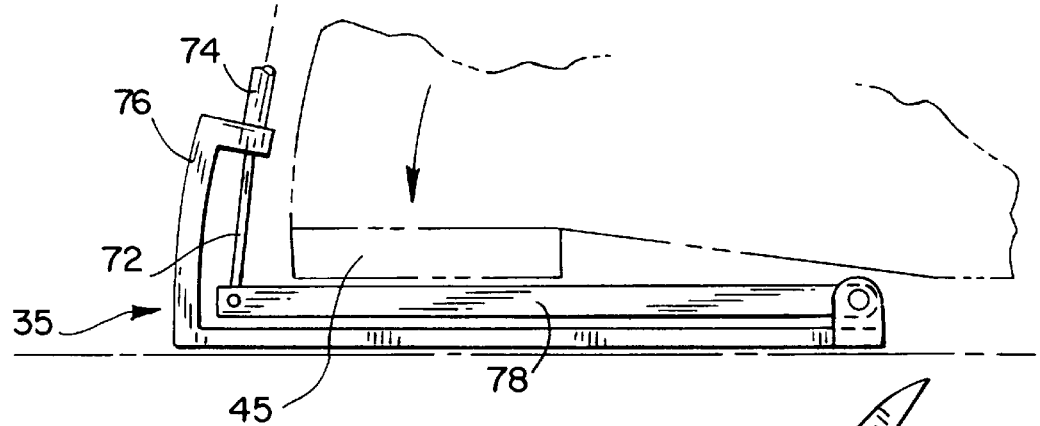
FIG. 4 depicts the reconfigurability of the cutting device capable of having multiple cutting heads and an extension handle attached thereto.
Figure 4:
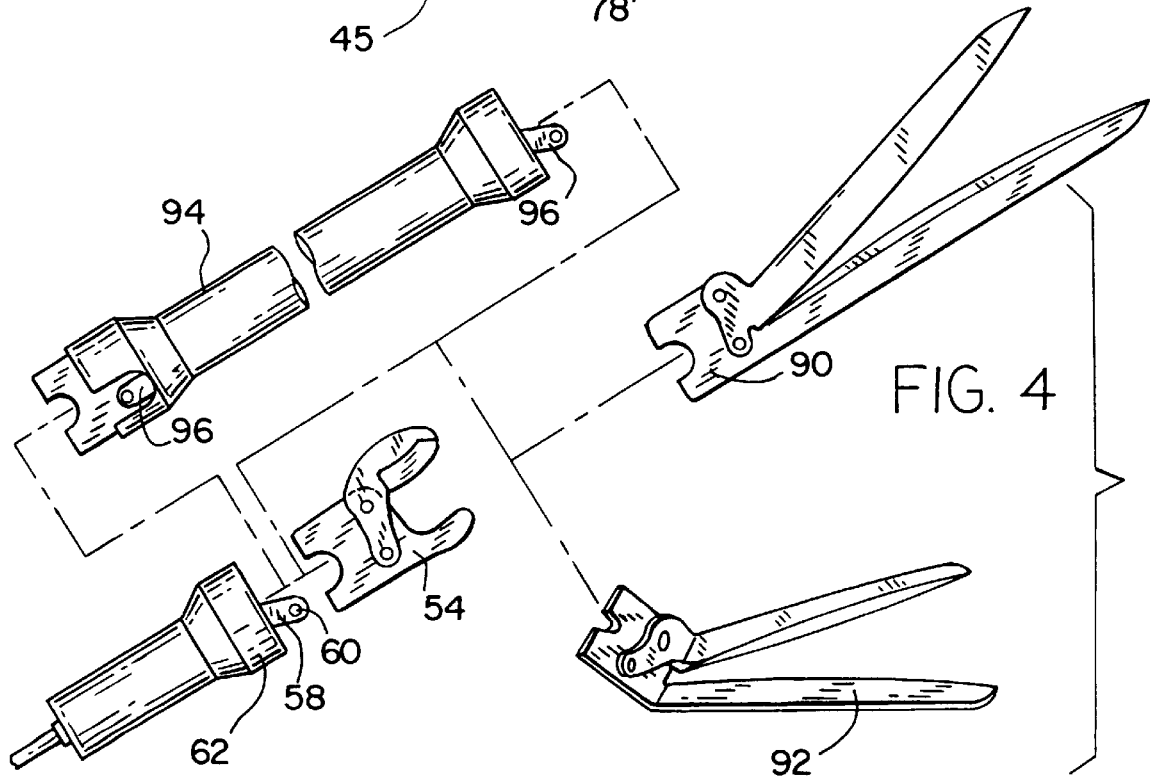

In one embodiment of the present invention, a variety of cutting heads may be coupled to connecting link 58 at pin 60 and coupled to housing 62, as depicted in FIG. 4. A variety of cutting implements may be attached to housing 62 and connecting link 58 such as pruner 54, hedge shears 90, grass shears 92, and other cutting devices. Furthermore, an extension handle 94 may be coupled to housing 62 by coupling connecting link 58 to a housing link 96. Housing link 96 extends out both ends of extension handle 94 such that housing link 96 may be coupled to connecting link 58 on a first end and to the cutting implement such as pruner 54, head shears 90, or grass shears 92, at a second end.

As depicted in FIG. 5A, operator 10 is depicted using foot operated cutting device 20 having extension handle 94 coupled to housing 62 and to cutting implement 92. As depicted in FIG. 5A, operator 10 is able to easily reach foliage that is located substantially above the head of operator 10, and is able to easily actuate shears 92 by pressing his heel 45 onto tread 78 of foot actuator 35.

Similarly, as depicted in FIG. 5B, operator 10 is positioned to cut foliage that is located substantially below the waist of operator 10 by using foot operated cutting device 20 having extension handle 94 attached to housing 96 at a first end and to shears 92 at a second end. As depicted in FIG. 5B, operator 10 does not have to bend over in a substantial manner in order to cut foliage that is low to the ground because extension handle 94 provides the necessary reach and actuation is simplified by providing actuation through heel 45 of operator 10 to tread 78 of foot actuator 35.

Referring now to FIG. 7, an alternative embodiment of the present invention is depicted. Foot operated cutting device 120 includes a cutting head 125 coupled to a housing 162, housing 162 being coupled to a hydraulic cylinder 163, and hydraulic cylinder 163 having a piston 165. Piston 165 is coupled to a rod 166, rod 166 being coupled to a connecting link 158 and connecting link 158 being coupled to a blade 152. Blade 152 is pivotally coupled to a jaw 154 at a pin 156. Hydraulic cylinder 163 is fluidly coupled to a hydraulic hose 174. Hydraulic hose 174 has a lumen 172 extending therethrough to communicate hydraulic fluid.

A foot actuator 135 has a base 176 and a tread 178 on which a heel 45 transmits a force provided by operator 10. A hydraulic cylinder 177 is coupled to tread 178. A piston 179 rides within hydraulic cylinder 177 and is coupled to base 176 by a piston rod 181.

In operation, as heel 45 transmits a force to tread 178, piston 179 pressurizes hydraulic fluid 183 that is contained within hydraulic cylinder 177, thereby pushing hydraulic fluid 183 through lumen 172 in hydraulic hose 174 and into hydraulic cylinder 163. As hydraulic fluid is communicated into hydraulic cylinder 163, piston 165 pushes rod 166 thereby causing blade 152 to pivot about pin 156 and causing a bight 153, that is formed by blade 152 and jaw 154, to close.

Once bight 153 is closed, and heel 45 releases pressure from tread 178, biasing spring 150, which stored potential energy during the closing process, presses on housing 162 and on a plate 167 that is coupled to rod 167. Therefore, biasing spring 150 causes piston 165 to pressurize fluid 183 through lumen 172 in hydraulic hose 174 and into hydraulic cylinder 177 thereby returning tread 178 to its unactuated position as depicted in FIG. 7.

Referring now to FIGS. 6A–6C, a foot actuator 235 is depicted. Foot actuator 235 is an alternative embodiment of foot actuator 35. As depicted in FIG. 6A, foot actuator 235 has a base portion 276 that is pivotally coupled to a tread portion 278. Tread portion 278 is coupled to a cable 272 and base portion 276 is coupled to a sheath 274. Foot actuator 235 is configured to be attachable to a shoe 240 by a toe strap 242 and a heel strap 244. (In another alternative embodiment, foot actuator 235 may be integrated into a special shoe.) Heel strap 244 is coupled to tread portion 278 and toe strap 242 is coupled to tread portion 278 by a toe strap loop 246.

As depicted in FIG. 6A, foot actuator 235 may be locked into an actuated position as shown in FIG. 6A, such that operator 10 would be able to walk with a normal gait having foot actuator 235 attached to shoe 240, foot actuator 235 not substantially interfering with the normal gait of an operator. Foot actuator 235 is put into a locked or fixed position by operator 10 positioning a hook 250 to engage a bottom bar 277 of base portion 276. Operator 10 may position hook 250 into the locked position by either performing an appropriate foot movement or by placing actuator 235 into the locked position by hand. In an alternative embodiment it may be possible to lock up foot actuator 235 by locking the cutting head, such as cutting head 25, in a closed position. As depicted in FIG. 6A, having foot actuator 235 in a locked position causes cutting head 25 to be locked in the closed position. Locking foot actuator 235 into a fixed position is not limited to the hook 250 and bar 277 configuration as depicted in FIGS. 6A–6C, other mechanical configurations may be applied to perform the locking function.

As depicted in FIG. 6B, when an operator chooses to use cutting device 20, hook portion 250 is disengaged from rod 277 such that tread 278 is free to move relative to base 276, as depicted in FIG. 6C. FIG. 6C depicts foot actuator 235 in the non-actuated or near non-actuated position, correspondingly a bight such as bight 53 in FIG. 1 would be open.

It is understood that the above description is of a preferred exemplary embodiment of the present invention, and that the invention is not limited to the specific forms described. For example, while the invention has been described in association with a device taking the form of a pruner, it can be used with other items as well. In addition, the foot actuator, cutting heads, housings, and actuating mechanisms can take other shapes and forms so long as they can be associated and that the housing is configured to support the drive mechanism and cutting device. Nevertheless, it should be understood that these and other substitutions, modifications, changes, and omissions may be made in the design and arrangement of the elements disclosed herein without departing from the scope of the appended claims.

What is claimed is:

1. A cutting device comprising:
    a cutting head;
    a housing supporting the cutting head; and
    an actuation mechanism including,
        a foot actuator, and
        a flexible force transmitter coupled to the foot actuator on a first end and coupled to the housing on a second end;
    wherein the actuation mechanism transmits a force input, developed at the foot actuator, through the flexible force transmitter and to the cutting head, thereby producing a cutting action and the actuation mechanism includes at least one hydraulic actuator.
2. The cutting device of claim 1 wherein the type of cutting head is interchangeable.
3. The cutting device of claim 1 wherein the cutting head is a pruner having a blade pivotally coupled to a jaw about a pivot point, the jaw cooperating with the blade to sever a workpiece received in a bight formed by the jaw.
4. The cutting device of claim 1 wherein the cutting head is a hedge shears.
5. The cutting device of claim 1 wherein the cutting head is a grass shears.
6. A cutting device comprising:
    a cutting head;
    a housing supporting the cutting head; and
    an actuation mechanism including,
        a foot actuator, and
        a flexible force transmitter coupled to the foot actuator on a first end and coupled to the housing on a second end;
    wherein the actuation mechanism transmits a force input, developed at the foot actuator, through the flexible force transmitter and to the cutting head, thereby producing a cutting action and the foot actuator is integrated into a shoe.
7. The cutting device of claim 1 wherein the foot actuator is attachable to a shoe.
8. The cutting device of claim 7 wherein the foot actuator is configured to avoid interference with the gait of an operator.
9. The cutting device of claim 1 wherein there is an extension handle between the housing and the cutting head.
10. A cutting device comprising:
    a cutting head;
    a foot actuator;
    a flexible force transmitter coupled to the foot actuator on a first end; and
    a housing supporting the cutting head and including a drive mechanism, the drive mechanism coupling the flexible force transmitter to the cutting head,
    wherein the flexible force transmitter receives a force input, developed at the foot actuator, and provides the force input, through the flexible force transmitter, to the blade, the cutting head includes a blade pivotally coupled to a jaw at a pivot point, the jaw cooperating with the blade to sever a workpiece received in a bight formed by the jaw and the cutting head includes a blade biasing spring.
11. A cutting device comprising:
    a cutting head;
    a foot actuator;
    a flexible force transmitter coupled to the foot actuator on a first end; and
    a housing supporting the cutting head and including a drive mechanism, the drive mechanism coupling the flexible force transmitter to the cutting head,
    wherein the flexible force transmitter receives a force input, developed at the foot actuator, and provides the force input, through the flexible force transmitter, to the blade, the flexible force transmitter is a cable having a sheath, the cable movable within the sheath and the sheath substantially surrounding the cable and the foot actuator is a pedal, the pedal having a base and a tread pivotally coupled to the base, the tread being coupled to the cable and the base being coupled to the sheath.
12. The cutting device of claim 10 wherein the type of cutting head is interchangeable.
13. The cutting device of claim 11 wherein the foot actuator is attachable to a shoe and the foot actuator is selectively clampable in a substantially fixed position.
14. The cutting device of claim 10 wherein an extension handle is attachable between the housing and the cutting head.

* * * * *